(12) United States Patent
Van Geest

(10) Patent No.: US 7,525,565 B2
(45) Date of Patent: Apr. 28, 2009

(54) 3D VIDEO CONFERENCING

(75) Inventor: Bartolomeus Wilhelmus Damianus Van Geest, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 684 days.

(21) Appl. No.: 10/548,846

(22) PCT Filed: Mar. 11, 2004

(86) PCT No.: PCT/IB2004/050234

§ 371 (c)(1),
(2), (4) Date: Sep. 9, 2005

(87) PCT Pub. No.: WO2004/082285

PCT Pub. Date: Sep. 23, 2004

(65) Prior Publication Data

US 2006/0209181 A1   Sep. 21, 2006

(30) Foreign Application Priority Data

Mar. 14, 2003   (EP) ............................. 03100648

(51) Int. Cl.
*H04N 7/14* (2006.01)
(52) U.S. Cl. .................... 348/14.1; 345/418
(58) Field of Classification Search .............. 348/0.14, 348/42–50, E13.014; 342/22; 345/418
See application file for complete search history.

(56) References Cited

U.S. PATENT DOCUMENTS

| 4,723,159 A * | 2/1988 | Imsand ................... 348/42 |
| 4,805,015 A * | 2/1989 | Copeland ................ 348/48 |
| 4,884,131 A * | 11/1989 | Chevion et al. .......... 348/43 |
| 5,617,334 A * | 4/1997 | Tseng et al. ........ 348/E13.014 |
| 6,609,451 B1 * | 8/2003 | Inoue et al. .............. 342/22 |
| 2002/0030678 A1 * | 3/2002 | Ostermann ............. 345/418 |

* cited by examiner

*Primary Examiner*—Curtis Kuntz
*Assistant Examiner*—Maria El-Zoobi
(74) *Attorney, Agent, or Firm*—Volpe and Koenig, P.C.

(57) ABSTRACT

A 3D video conferencing station (200, 300, 500, 700) comprises: a camera (104) for acquiring a first (604) and second (602) image of a first user (110); and optical means for visualizing stereo images of a second user, the optical means comprising glasses for the first user (110). The station (200, 300, 500, 700) is arranged to acquire the first image (604) at a first moment at which the left eye of the first user (110) is better observable by the camera (104) than a second moment and to acquire the second image (602) at the second moment at which the right eye of the first user (110) is better observable by the camera (104) than at the first moment. The station further comprises combining means (714) for combining a first portion of the first image (604) and a second portion of the second image (602) into a third image (606) in which the left eye and the right eye of the first user (110) are relatively well visible.

8 Claims, 9 Drawing Sheets

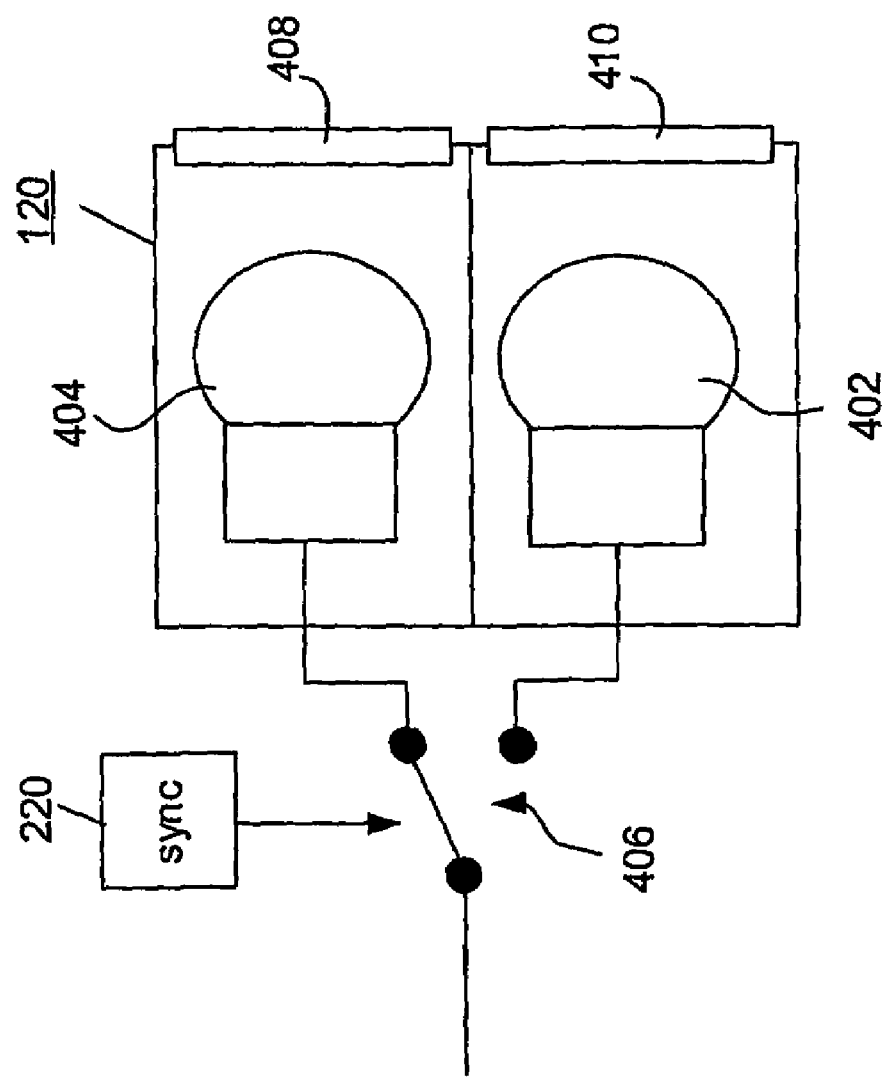

3D VIDEO CONFERENCING

The invention relates to a 3D video conferencing station, comprising:
- a camera for acquiring a first image of a first user and a second image of the first user;
- receiving means for receiving stereo images of a second user;
- optical means for visualizing the stereo images, the optical means comprising glasses for the first user.

Figure 1:
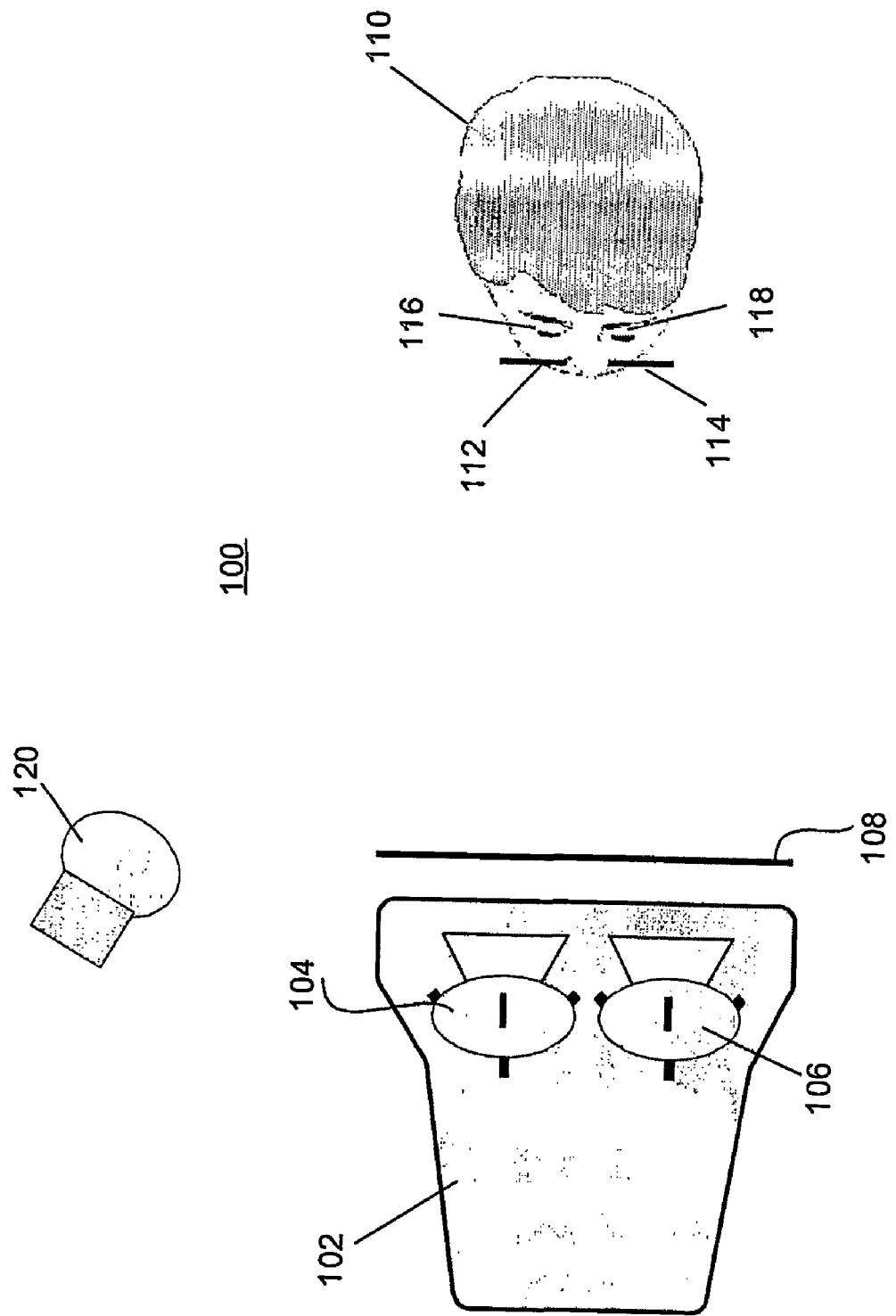

It is well known that non-verbal messages form an important aspect of personal communication. It is a reason why people have a natural need to see the persons they talk to. The advent of low-cost webcams and the growing bandwidth for IP-traffic start to enable personal visual communication for people at home or in the office. A way to add impressiveness to the visual communication system, i.e. give the users the impression to really be with the one they talk to, is adding a third spatial dimension to the visualization. FIG. 1 shows a possible setup, i.e. an example of a 3D video conferencing station. Two cameras 104-106 register a stereo image of a first user. This stereo image is transmitted over a communication channel to a remote location where a similar 3D video conferencing station is placed. There, the stereo images are e.g. time sequentially displayed. The 3D video conferencing station comprises an electro-optical device 108 which is designed to alternate between a first and a second polarization direction. The electro-optical device 108 is placed in front of the display device 102, e.g. a CRT monitor and is synchronized to the alternatingly displayed left and right images. The first user wears glasses with, for each eye 116-118 different polarization filters 112-114. The left polarization filter 114 is substantially translucent for light with the first polarization direction and substantially opaque for light with the second polarization direction. The right polarization filter 112 is substantially translucent for light with the second polarization direction and substantially opaque for light with the first polarization direction. In this way the left eye 118 of the first user is enabled to see the images that were registered with the (not depicted) left camera of the remote 3D video conferencing station and the right 116 eye of the first user is enabled to see the images that were registered with the (not depicted) right camera of the remote 3D video conferencing station. Consequently the first user perceives a stereoscopic image of the second, remote user.

The use of glasses with polarization filters 112-114 for this application has the annoying side effect that the visibility of the eyes is reduced. In other words, it makes it difficult to see the eyes of the first user were the second user is talking to and vice versa. Notice that seeing the eyes is probably the most important reason for choosing visual communication in the first place. The reduction of visibility is explained as follows. A light-source 120 illuminates the face of the first user 110. Image are captured with a set of cameras 104-106. Imagine a light-ray originating from the light-source 120, reflecting at the right eye-area 116 of the user towards a camera 104. This light-ray passes the polarization filter 112 in front of the right eye 116, becomes polarized in a first direction and hence looses 50% of its intensity. Subsequently the light-ray reflects at the eye area 116 and looses its polarization. The reflected light-ray again passes the polarization filter 112 and becomes polarized, again looses 50% of its intensity; and is finally registered by the camera 104. In this process 75% of the original intensity is lost, when compared to light-rays that reflect on other parts of the face.

It is an object of the invention to provide a 3D video conferencing station of the kind described in the opening paragraph whereby the eyes of the first user are better visible by the second user of a remote 3D video conferencing station.

This object of the invention is achieved in that the station is arranged to acquire the first image at a first moment at which the left eye of the first user is better observable by the camera than at a second moment and to acquire the second image at the second moment at which the right eye of the first user is better observable by the camera than at the first moment and that the station comprises computing means for computing a third image on basis of a first portion of the first image corresponding to the left eye of the first user and a second portion of the second image corresponding to the right eye of the first user. As a consequence the left eye and the right eye of the first user are relatively well visible. An important aspect of the invention is synchronization of image acquisition. That means that the first image is acquired at a first moment at which light-rays from the area of the face in the neighborhood of the left eye of the first user can pass without substantial loss of intensity through the left part of the glasses towards the camera compared with other light-rays from other parts of the face. Similarly, the second image is acquired at a second moment at which light-rays from the area of the face in the neighborhood of the right eye of the first user can pass without substantial loss of intensity through the left part of the glasses towards the camera compared with the other light-rays from other parts of the face.

Another important aspect of the invention is the composition of a third image on basis of the first image which is acquired at the first moment at which the area of the face in the neighborhood of the left eye was relatively well observable by the camera compared with other parts of the face of the first user and on basis of the second image which is acquired at the second moment at which the area of the face in the neighborhood of the right eye was relatively well observable by the camera compared with other parts of the face of the first user.

An embodiment of the 3D video conferencing station according to the invention comprises:
- a display device for displaying the stereo images;
- a first electro-optical shutter being disposed in the left part of the glasses, the first electro-optical shutter having a first open state enabling the first user to view the display device with the left eye and a first closed state disabling the first user to view the display device with the left eye;
- a second electro-optical shutter being disposed in the right part of the glasses, the second electro-optical shutter having a second open state enabling the first user to view the display device with the right eye and a second closed state disabling the first user to view the display device with the right eye; and
- synchronizing means to acquire the first image when the first electro-optical shutter is in the first open state and to acquire the second image when the second electro-optical shutter is in the second open state.

In this embodiment according to the invention, the display of the stereo images is based on time-multiplexing. The two electro-optical shutters in front of the left and the right eye, respectively are alternatingly closed and opened to enable the first user to see the images being displayed by the display device with the corresponding eyes. That means that the image display device is synchronized with the two electro-optical shutters. The image acquisition by means of the camera is also synchronized with these electro-optical shutters. That means that the first image is acquired by means of the camera at the moment that the first electro-optical shutter is in the open state and the second image is acquired by means of the camera at the moment that the second electro-optical shutter is in the open state. Acquisition of images at the moment of the electro-optical shutter being in the open state means that the observability by the cameras of the areas around the eyes is comparable with the observability by the cameras of the rest of the face.

Another embodiment of the 3D video conferencing station according to the invention comprises:

- a display device for displaying the stereo images;
- a first polarization means being disposed in front of the display device and being arranged to switch between a first polarization state in which the first polarization means is substantially translucent for light with a first polarization direction and substantially opaque for light with a second polarization direction and a second polarization state in which the first polarization means is substantially translucent for light with the second polarization direction and substantially opaque for light with the first polarization direction;
- a second polarization means being disposed in the left part of the glasses and being substantially translucent for light with the first polarization direction and substantially opaque for light with the second polarization direction;
- a third polarization means being disposed in the right part of the glasses and being substantially translucent for light with the second polarization direction and substantially opaque for light with the first polarization direction;
- a fourth polarization means being disposed in front of the camera and being arranged to switch between a third polarization state in which the fourth polarization means is substantially translucent for light with the first polarization direction and substantially opaque for light with the second polarization direction and a fourth polarization state in which the fourth polarization means is substantially translucent for light with the second polarization direction and substantially opaque for light with the first polarization direction; and
- synchronizing means to acquire the first image when the fourth polarization means is in the third polarization state and to acquire the second image when the fourth polarization means is in the fourth polarization state.

In this embodiment according to the invention, the display of the stereo images is also based on time-multiplexing. The first polarization means being disposed in front of the display device is switched between a first polarization state which matches with a first polarization direction of the second polarization means being disposed in the left part of the glasses and a second polarization state which matches with a second polarization direction of the third polarization means being disposed in the right part of the glasses. The image display device is synchronized with the first polarization means being disposed in front of the display device. The image acquisition by means of the camera is also synchronized with the fourth polarization means being disposed in front of the camera That means that the first image is acquired by means of the camera at the first moment at which the state of the fourth polarization means being disposed in front of the camera matches with the first polarization direction of the second polarization means being disposed in the left part of the glasses and the second image is acquired by means of the camera at the second moment at which the state of the fourth polarization means being disposed in front of the camera matches with the second polarization direction of the third polarization means being disposed in the right part of the glasses. Acquisition of images at the moment of the fourth polarization means being in a polarization state which matches with the polarization directions of the respective glasses means that the observability by the cameras of the areas around the eyes is substantially improved.

In an embodiment of the 3D video conferencing station according to the invention, the first polarization means is the fourth polarization means. In other words the first polarization means and the fourth polarization means are combined. That means that both the cameras and the display device are placed behind the same polarization device.

Another embodiment of the 3D video conferencing station according to the invention comprises:

- a display device for displaying the stereo images;
- a first polarization means being disposed in front of a first part of the display device and being substantially translucent for light with a first polarization direction and substantially opaque for light with a second polarization direction;
- a second polarization means being disposed in front of a second part of the display device and being substantially translucent for light with the second polarization direction and substantially opaque for light with the first polarization direction;
- a third polarization means being disposed in the left part of the glasses and being substantially translucent for light with the first polarization direction and substantially opaque for light with the second polarization direction;
- a fourth polarization means being disposed in the right part of the glasses and being substantially translucent for light with the second polarization direction and substantially opaque for light with the first polarization direction;
- a fifth polarization means being disposed in front of the camera and being arranged to switch between a first polarization state in which the fifth polarization means is substantially translucent for light with the first polarization direction and substantially opaque for light with the second polarization direction and a second polarization state in which the fifth polarization means is substantially translucent for light with the second polarization direction and substantially opaque for light with the first polarization direction; and
- synchronizing means to acquire the first image when the fifth polarization means is in the first polarization state and to acquire the second image when the fifth polarization means is in the second polarization state.

In this embodiment according to the invention, the display of the stereo images is based on spatial multiplexing. That means that first parts of the display device are applied to display the respective portions of the left ones of the stereo pairs and that second parts of the display device, which are interleaved with the first parts, are applied to display the respective portions of the right ones of the stereo pairs. In front of the first parts a first group of polarization filters with the first polarization direction are disposed and in front of the second parts a second group of polarization filters with the second polarization direction are disposed. The first polarization direction of the first group of polarization filters matches with the first polarization direction of the third polarization means being disposed in the left part of the glasses and the second polarization direction of the second group of polarization filters matches with the second polarization direction of the fourth polarization means being disposed in the right part of the glasses.

The image acquisition by means of the camera is also synchronized with the fifth polarization means being disposed in front of the camera. That means that the first image is acquired by means of the camera at the first moment at which the state of the fifth polarization means being disposed in front of the camera matches with the first polarization direction of the third polarization means being disposed in the left part of the glasses and the second image is acquired by means of the camera at the second moment at which the state of the fifth polarization means being disposed in front of the camera matches with a second polarization direction of the fourth polarization means being disposed in the right part of the glasses. Acquisition of images at the moment of the fifth polarization means being in a polarization state which matches with the polarization directions of the respective glasses means that the observability by the cameras of the areas around the eyes is substantially improved.

An embodiment of the 3D video conferencing station according to the invention comprises a light source being arranged to create light with the first polarization direction at the first moment and to create light with the second polarization direction at the second moment. An advantage of this embodiment is that the contrast between light from areas behind the glasses and other parts of the face is minimal.

In an embodiment of the 3D video conferencing station according to the invention, the combining means are arranged to compute the third image on basis of a difference between the first image and the second image. Preferably the combining means are arranged:
- to compute an intermediate image by computing the difference between the first image and the second image;
- to segment the intermediate image to detect a first region corresponding to the first portion;
- to extract the first portion from the first image on basis of the segmentation; and
- to combine the first portion with the second portion of the second image.

Figure 2A:
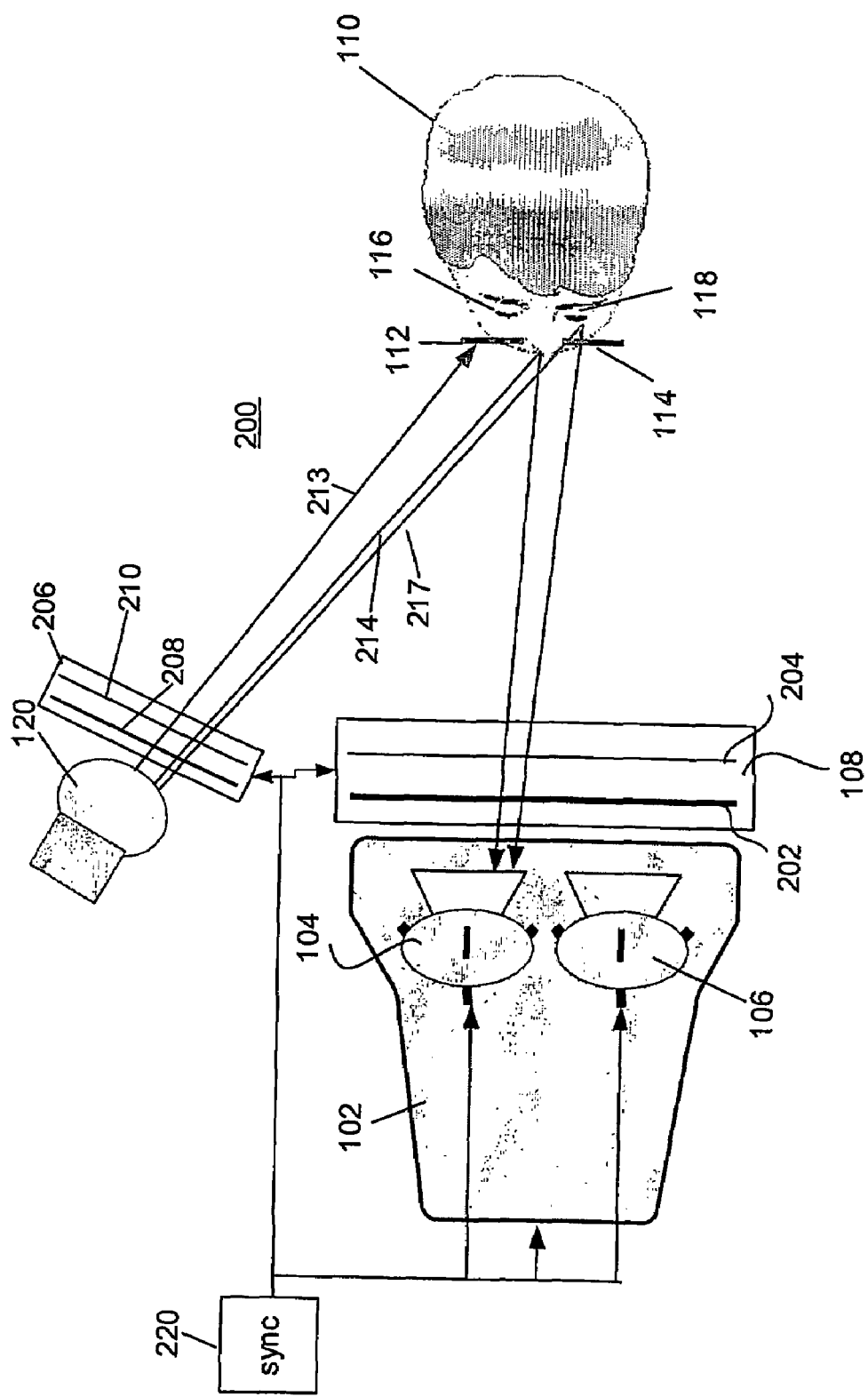
Figure 2B:
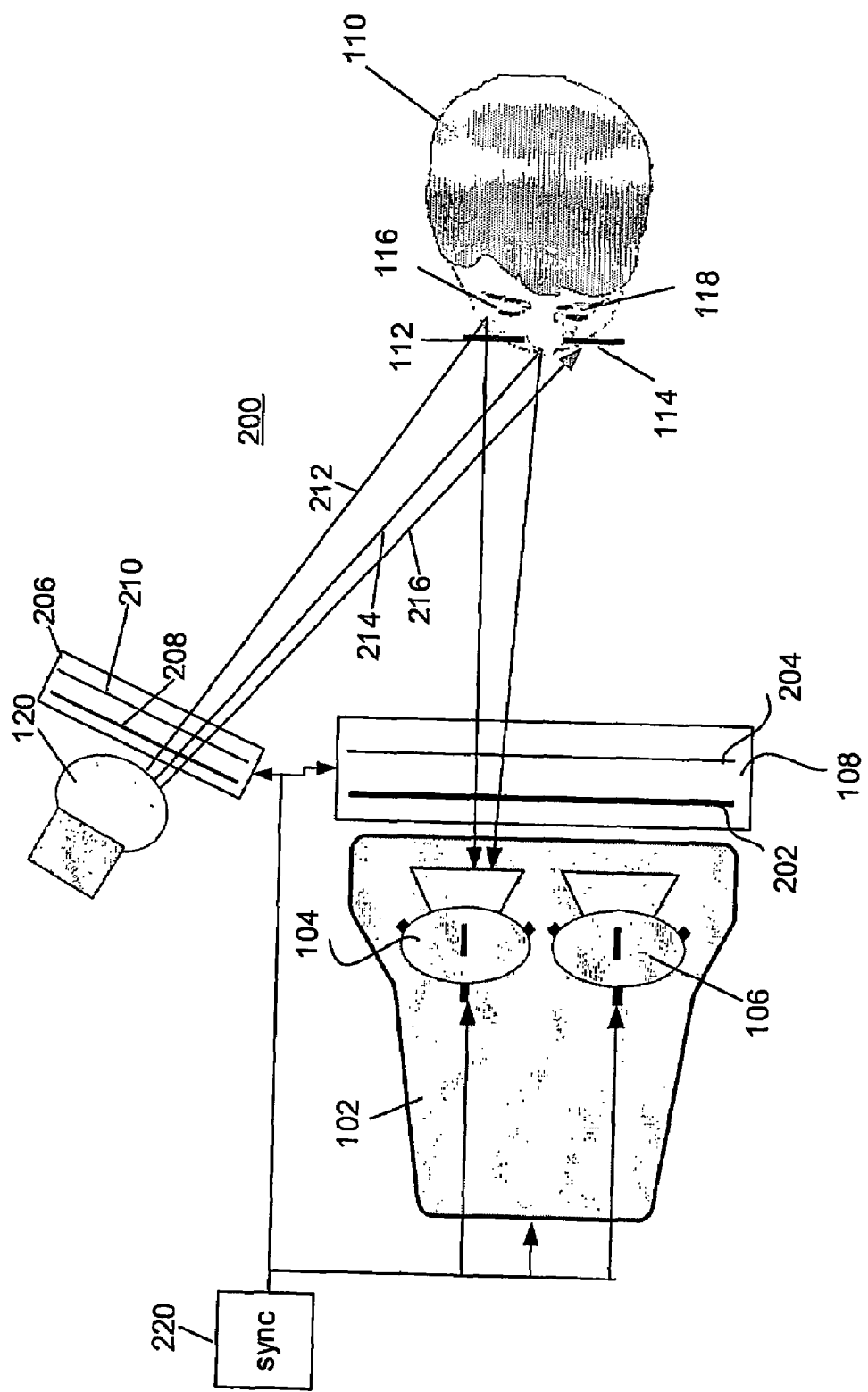
Figure 3A:
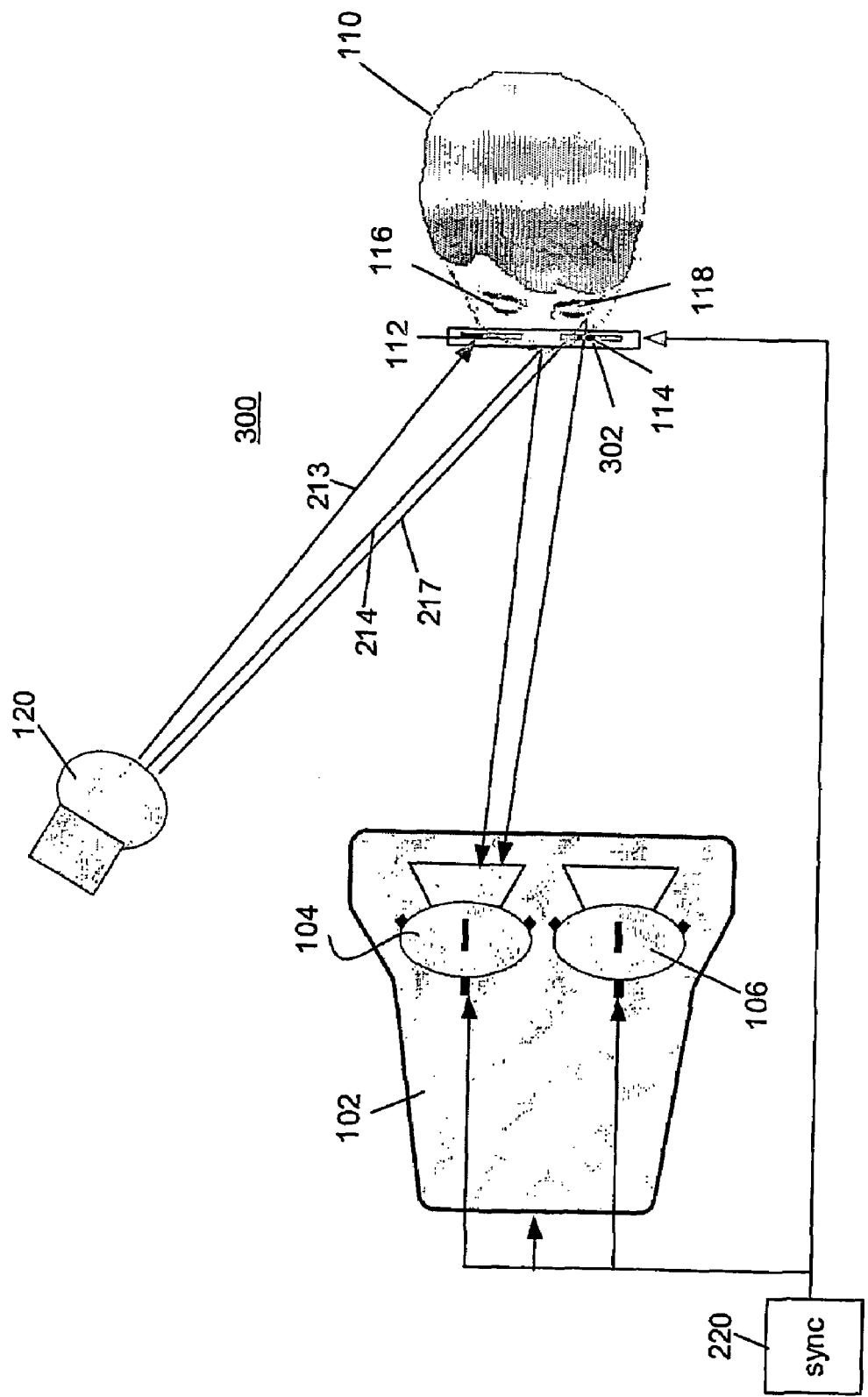
Figure 3B:
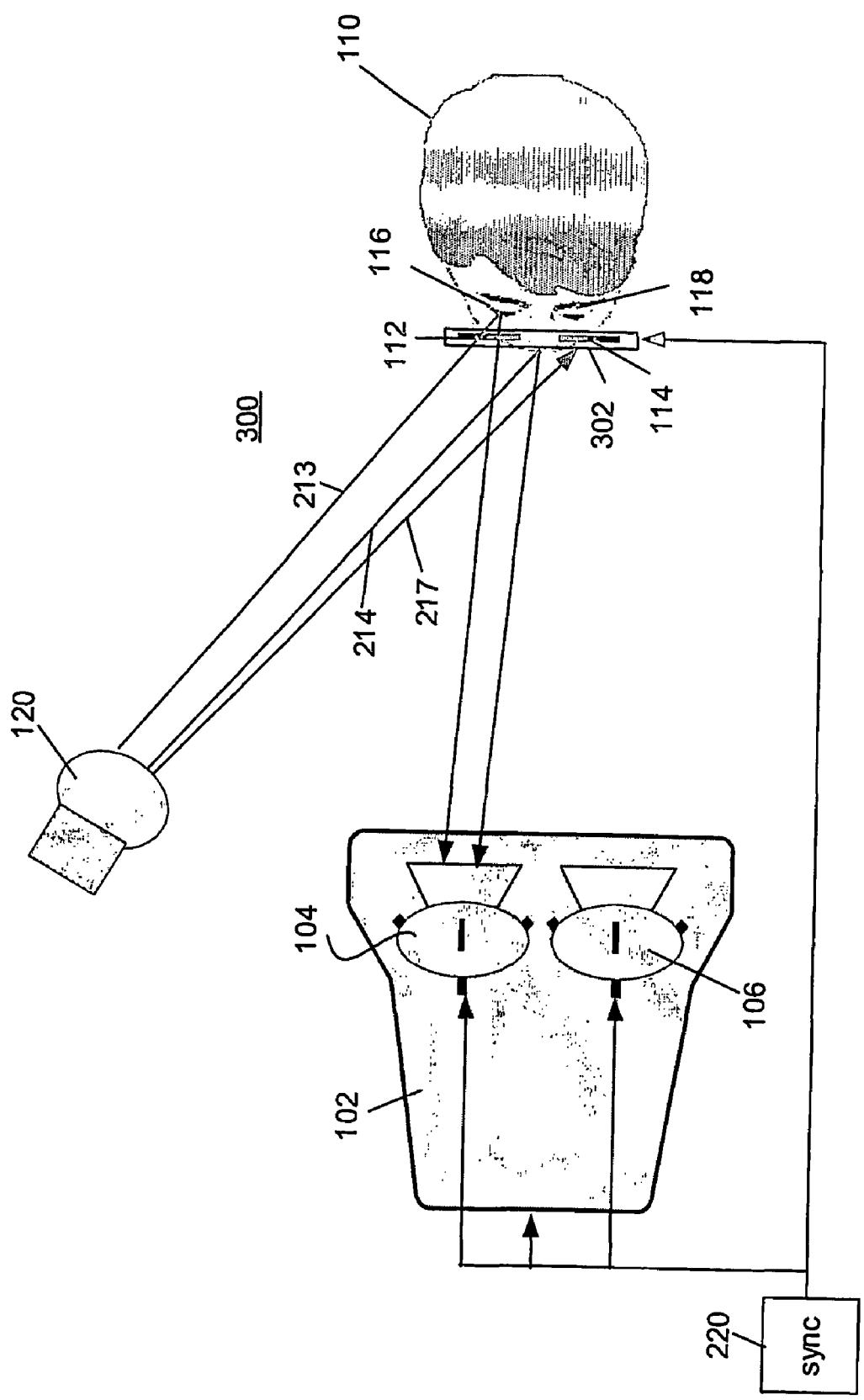
Figure 5:
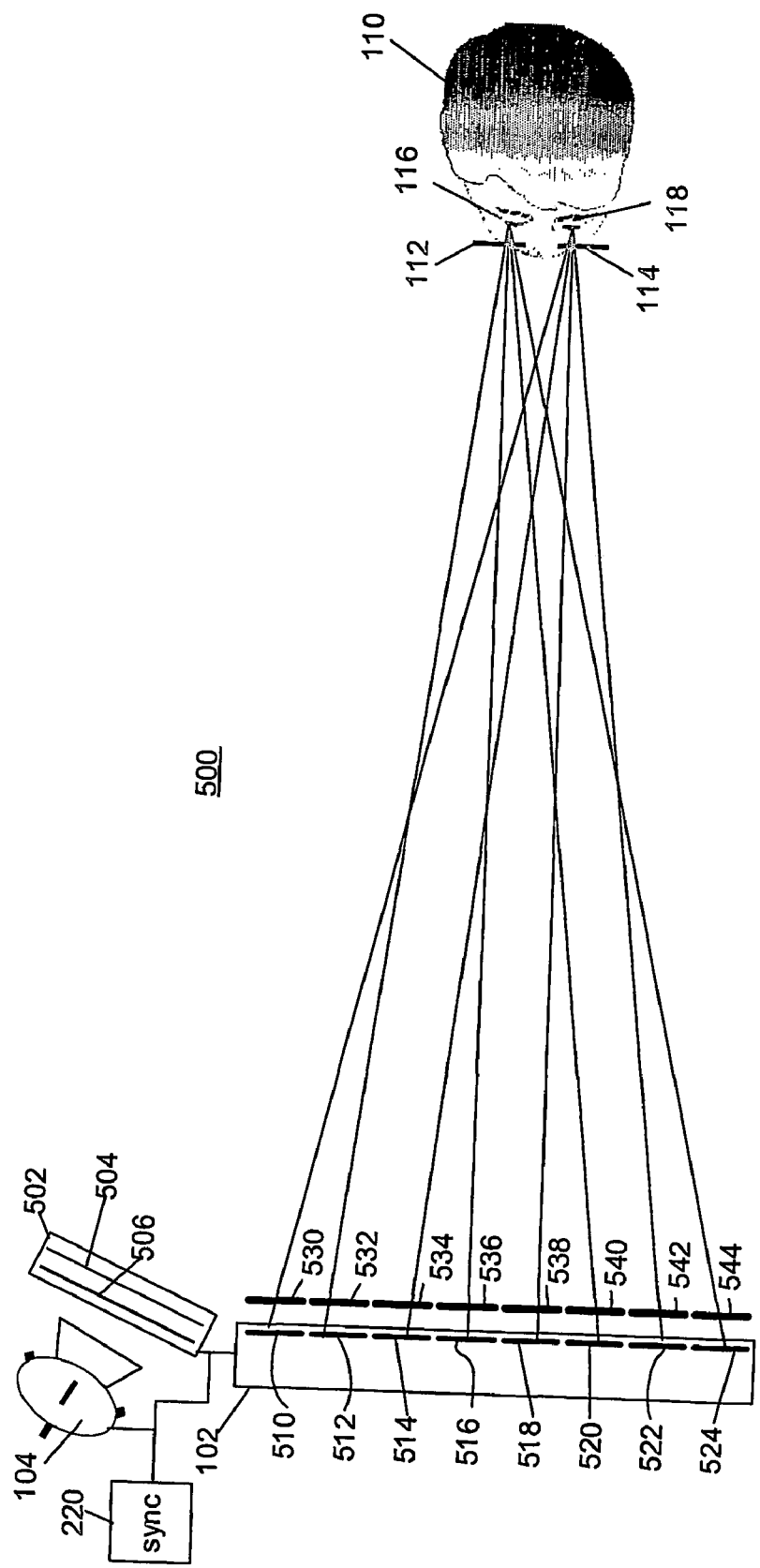
Figure 6:
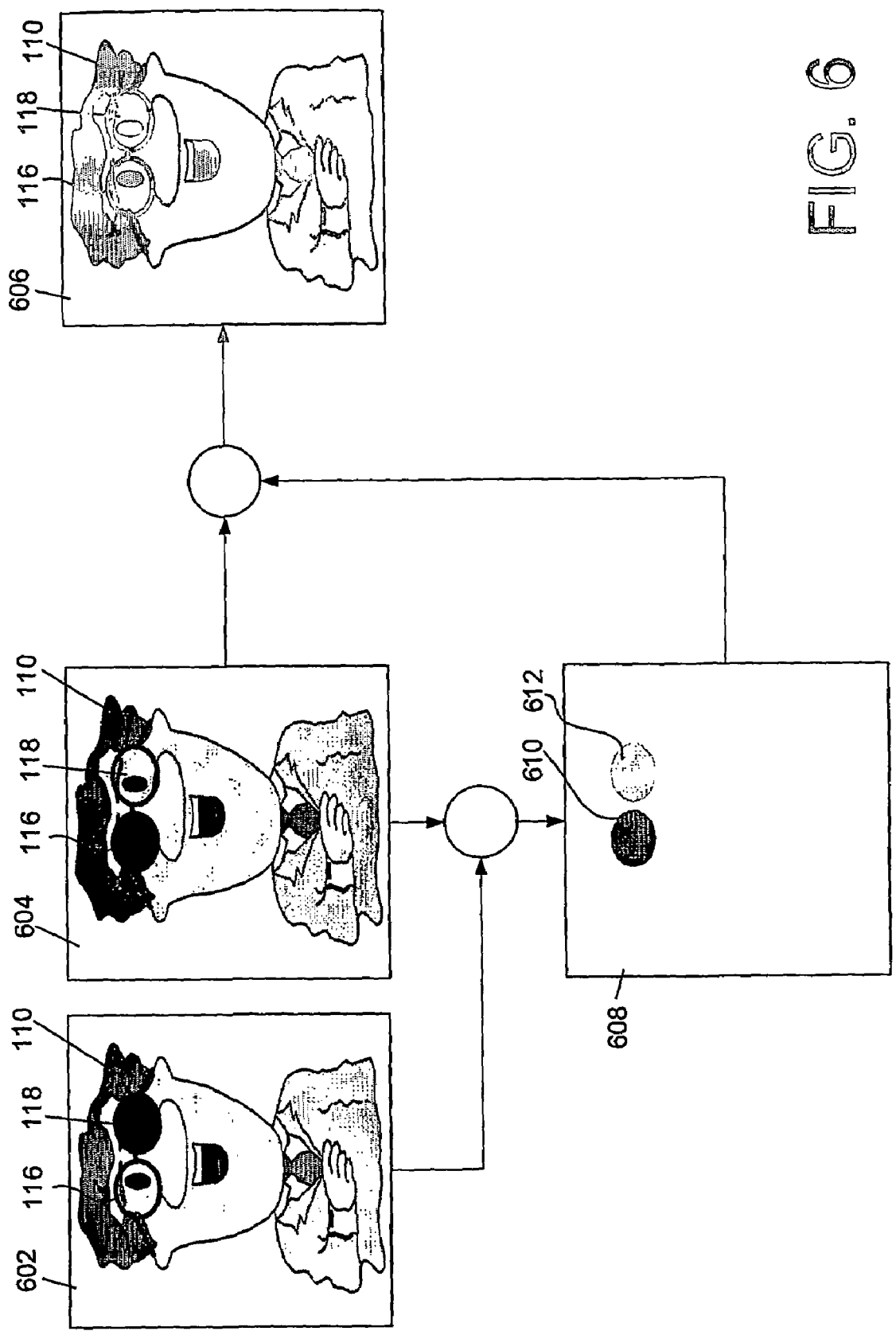
Figure 7:
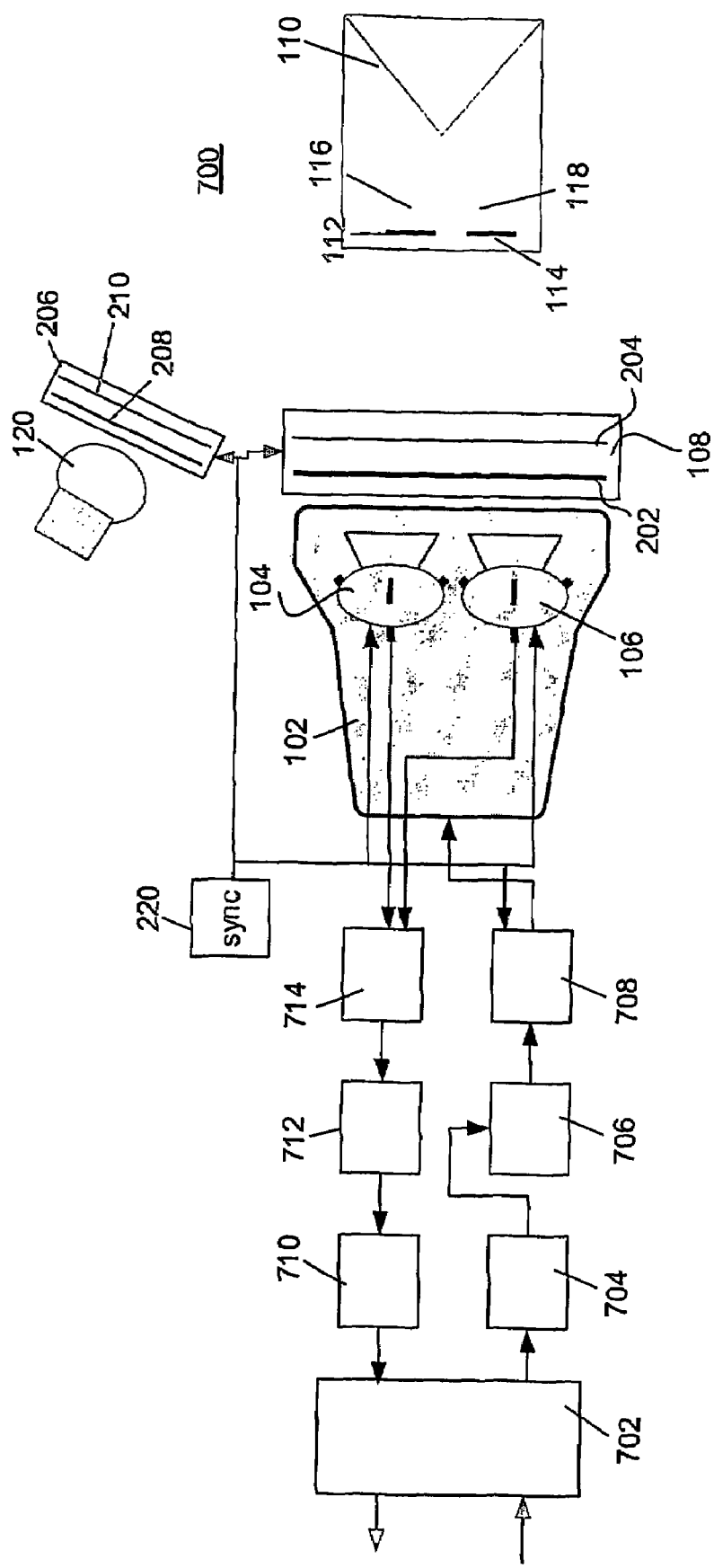

These and other aspects of the 3D video conferencing station according to the invention will become apparent from and will be elucidated with respect to the implementations and embodiments described hereinafter and with reference to the accompanying drawings, wherein:

FIG. 1 schematically shows an embodiment of a 3D video conferencing station according to the prior art;

FIG. 2A schematically shows an embodiment of a 3D video conferencing station comprising a polarization device being in a first polarization state which matches with the polarization direction of the polarization filter in front of the left eye;

FIG. 2B schematically shows the embodiment of the 3D video conferencing station of FIG. 2A comprising the polarization device being in a second polarization state which matches with the polarization direction of the polarization filter in front of the right eye;

FIG. 3A schematically shows an embodiment of a 3D video conferencing station comprising two electro-optical shutters of which the first one in front of the left eye is in an open state and the other in front of the right eye is in a closed state;

FIG. 3B schematically shows the embodiment of the 3D video conferencing station of FIG. 3A comprising two electro-optical shutters of which the first one in front of the left eye is in the closed state and the other in front of the right eye is in the open state;

FIG. 4 schematically shows a light source which is arranged to create light with the first polarization direction at the first moment and to create light with the second polarization direction at the second moment;

FIG. 5 schematically shows an embodiment of a 3D video conferencing station comprising display means in which the display of the stereo images is based on spatial multiplexing;

FIG. 6 schematically shows the image processing steps to combine the first and the second image into the third image to be transmitted; and FIG. 7 schematically shows an embodiment of a 3D video conferencing station comprising communication means.

Same reference numerals are used to denote similar parts throughout the figures.

FIG. 1 schematically shows an embodiment of a 3D video conferencing station 100 according to the prior art, as described in the introduction above.

FIG. 2A schematically shows an embodiment of a 3D video conferencing station 200 according to the invention. The 3D video conferencing station 200 comprises:
- a display device 102 for displaying the stereo images;
- a first polarization device 108 being disposed in front of the display device 102 and in front of the cameras 104-106 and being arranged to switch between a first polarization state in which the first polarization means 108 is substantially translucent for light with a first polarization direction and substantially opaque for light with a second polarization direction and a second polarization state in which the first polarization means is substantially translucent for light with the second polarization direction and substantially opaque for light with the first polarization direction;
- a first polarization filter 114 being disposed in the left part of the glasses and being substantially translucent for light with the first polarization direction and substantially opaque for light with the second polarization direction;
- a second polarization filter 112 being disposed in the right part of the glasses and being substantially translucent for light with the second polarization direction and substantially opaque for light with the first polarization direction;
- a light source 120 comprising polarizing means 206, the light-source being arranged to create light with either the first polarization direction or with the second polarization direction. This light source 120 is optional; and
- a synchronizer 220 to synchronize the cameras 104-106 with the first polarization device 108. Preferably the display device 102 and the light-source are also synchronized with the cameras 104-106 by means of the same synchronizer 220.

The image acquisition of the 3D video conferencing station 200 is as follows. It is assumed that the first polarization device 108 comprises two layers: a polarization layer 202 and an electrically controlled LC (Liquid Crystal) layer 204. This LC-layer 204 is a birefringent material that can change the direction of polarization of the polarized light passing through it. So the LC-layer 204 is arranged to adapt the direction of polarization of the polarized light generated by the display device 102 but is also arranged to adapt the direction of polarization of polarized light propagating in the opposite direction i.e. polarized light that originates from the illuminated scene, including the face of the first user 110. Since the LC-layer 204 doesn't affect non-polarized light, such light is only affected by the polarization layer 202 behind the LC layer 204 when it propagates through the first polarization device 108 towards the cameras 104-106.

Assume that the first polarization device 108 is in a first polarization state which matches with the polarization direction of the polarization filter 114 in front of the left eye 118.

The light source 120 comprising the polarizing means 206 is generating light with having a polarization direction which is substantially equal with the polarization direction of the polarization filter 114 in front of the left eye 118.

Imagine a light-ray 217 that originates from the light-source 120 and which reflects at the left eye-area 118 of the first user towards the camera 104. This light-ray 217 is polarized and doesn't loose intensity when it passes the first polarization filter 114 in front of the left eye 118 of the first user 110. The light-ray 217 is reflected at the left eye-area 118 and as a consequence looses its polarization. When passing the first polarization filter 114 for the second time 50% of its intensity is lost because only light with the first polarization direction, i.e. the polarization direction of the first polarization filter 114, can pass. It is assumed that the LC-layer 204 of the first polarization device 108 in front of the cameras 104-106 and the display device 102 is in the first polarization state which matches with the first polarization direction. Finally the light-ray 217 passes unaffected the polarization layer 202 of the first polarization device 108. In the case that the reflectivity of the users face is equal to 100%, then the light-ray 217 reaches the cameras 104-106 with 50% of its original intensity.

Next, a similar evaluation for a light-ray 214 that reflects at another part of the users face is described. The polarized light-ray 214 reflects at the users face where it looses its polarization; it passes the LC-layer 204 of the first polarization device 108 unaffected and finally passes the polarization filter 202 of the first polarization device 108 where it looses 50% of its intensity.

Hence, both light-rays 217 and 214 loose 50% of their original intensity. That means that there is no difference in contrast between the covered part of the face, i.e. the left eye-area 118 and the uncovered part of the face, e.g. the nose. In other words, in the first image which is acquired during this first polarization state of the first polarization device 108, the left part 114 of the glasses is transparent. However, the right part 112 of the glasses is dark since its polarization direction doesn't match the polarization direction of the illuminated light as generated by the light source 120 comprising polarizing means 206. As a consequence a light-ray 213 can not pass the second polarization filter 112 being disposed in the right part of the glasses. Besides that the polarization direction of the second polarization filter 112 doesn't match the current polarization direction of the first polarization device 108.

FIG. 2B schematically shows the embodiment of the 3D video conferencing station of FIG. 2A. However now the first polarization device 108 is in a second polarization state which matches with the polarization direction of the polarization filter 112 in front of the right eye 116. Imagine a light-ray 212 that originates from the light-source 120 and which reflects at the left eye-area 116 of the first user towards the camera 104. This light-ray 212 is polarized and doesn't loose intensity when it passes the second polarization filter 112 in front of the right eye 116 of the first user 110. The light-ray 212 is reflected at the right eye-area 116 and as a consequence looses its polarization. When passing the second polarization filter 112 for the second time 50% of its intensity is lost because only light with the second polarization direction, i.e. the polarization direction of the second polarization filter 112, can pass. It is assumed that the LC-layer 204 of the first polarization device 108 in front of the cameras 104-106 and the display device 102 is in the second polarization state which matches with the second polarization direction. Finally the light-ray 212 passes unaffected the polarization layer 202 of the first polarization device 108. In the case that the reflectivity of the users face is equal to 100%, then the light-ray 212 reaches the cameras 104-106 with 50% of its original intensity.

Hence, both light-rays 212 and 214 loose 50% of their original intensity. That means that there is no difference in contrast between the covered part of the face, i.e. the right eye-area 116 and the uncovered part of the face, e.g. the nose. In other words, in the second image which is acquired during this second polarization state of the first polarization device 108, the right part 112 of the glasses is transparent. However, the left part 114 of the glasses is dark since its polarization direction doesn't match the polarization direction of the illuminated light as generated by the light source 120 comprising polarizing means 206. As a consequence a light-ray 216 can not pass the first polarization filter 114 which is disposed in the left part of the glasses. Besides that the polarization direction of the first polarization filter 114 doesn't match the current polarization direction of the first polarization device 108.

By alternatingly setting the first polarization device 108 and optionally the polarizing means 206 in the first or the second polarization state, the cameras 104-106 are enabled to register images where alternately the left eye 118 and the right eye 116 of the first user 110 are clearly visible and the other eye not.

FIG. 3A schematically shows another embodiment of a 3D video conferencing station 300 according to the invention, comprising:

- a display device 102 for displaying the stereo images, representing the second user at the remote location;
- a first electro-optical shutter 114 being disposed in the left part of the glasses 302, the first electro-optical shutter 114 having a first open state enabling the first user 110 to view the display device 102 with the left eye 118 and a first closed state disabling the first user 110 to view the display device 102 with the left eye 118;
- a second electro-optical shutter 112 being disposed in the right part of the glasses 302, the second electro-optical shutter 112 having a second open state enabling the first user 110 to view the display device 102 with the right eye 116 and a second closed state disabling the first user 110 to view the display device 110 with the right eye 116; and
- a synchronizer 220 to acquire the first image when the first electro-optical shutter 114 is in the first open state and to acquire the second image when the second electro-optical shutter 112 is in the second open state.

More particular, FIG. 3A schematically shows the 3D video conferencing station 300 at a first moment at which the first electro-optical shutter 114 in front of the left eye 118 is in the open state and the second electro-optical shutter 112 in front of the right eye 116 is in the closed state. FIG. 3B schematically shows the same 3D video conferencing station 300 at a second moment at which the second electro-optical shutter 114 in front of the left eye 118 is in the closed state and the second electro-optical shutter 112 in front of the right eye 116 is in the open state.

The synchronizing means 220 are arranged to control the display of the stereo images, the two electro-optical shutters 112-114 in the glasses 302 and the cameras 104-106. The synchronization is such that a first image is taken at the first moment that the left eye is relatively well observable by the cameras 104-106 and the second image is taken at the second moment that the right eye is relatively well observable by the cameras 104-106.

FIG. 4 schematically shows a light source 120 which is arranged to create light with the first polarization direction at the first moment and to create light with the second polarization direction at the second moment. The light source 120 comprises:

- a first light generating means 404, e.g. lamp, in a first casing which comprises a first passive polarization filter 408 which is substantially transparent for light in a first polarization direction;
- a second light generating means 402, e.g. lamp, in a second casing which comprises a second passive polarization filter 410 which is substantially transparent for light in a second polarization direction; and
- a switch 406 enabling either the first light generating means 404 to generate light or the second light generating means 402 to generate light.

The working of the light source 120 is as follows. If the switch 406 enables the first light generating means 404 to generate light then this light partly passes the first passive polarization filter 408. As a consequence the light source 120 then creates light with the first polarization direction. If the switch 406 enables the second light generating means 402 to generate light then this light partly passes the second passive polarization filter 410. As a consequence the light source 120 then creates light with the second polarization direction.

This light source 120 can be applied in the 3D video conferencing station as described in connection with FIGS. 2A and 2B. In that case the light source 120 is connected to the synchronizer 220.

FIG. 5 schematically shows an embodiment of a 3D video conferencing station comprising a display device 102 in which the display of the stereo images is based on spatial multiplexing. The combination of a display device 102 and an array of polarizers 530-544 is e.g. as commercially available by VREX under the name μPol™. The μPol is an optical device that changes the polarization of light on a line by line basis. It is a periodic array of microscopically small polarizers 530-544 which spatially alternate between the first polarization direction and the second polarization direction, being perpendicular to the first.

The 3D video conferencing station 500 comprises:
- a display device 102 for displaying the stereo images;
- a first polarization means 530 being disposed in front of a first part 510 of the display device 102 and being substantially translucent for light with a first polarization direction and substantially opaque for light with a second polarization direction;
- a second polarization means 532 being disposed in front of a second part 512 of the display device 102 and being substantially translucent for light with the second polarization direction and substantially opaque for light with the first polarization direction;
- a third polarization means 114 being disposed in the left part of the glasses and being substantially translucent for light with the first polarization direction and substantially opaque for light with the second polarization direction;
- a fourth polarization means 112 being disposed in the right part of the glasses and being substantially translucent for light with the second polarization direction and substantially opaque for light with the first polarization direction;
- a fifth polarization means 502 being disposed in front of the camera 104 and being arranged to switch between a first polarization state in which the fifth polarization means is substantially translucent for light with the first polarization direction and substantially opaque for light with the second polarization direction and a second polarization state in which the fifth polarization means is substantially translucent for light with the second polarization direction and substantially opaque for light with the first polarization direction; and
- a synchronizer 220 to acquire the first image when the fifth polarization means 502 is in the first polarization state and to acquire the second image when the fifth polarization means 502 is in the second polarization state.

The fifth polarization means 502 comprises two layers: a polarization layer 506 and an electrically controlled LC (Liquid Crystal) layer 504. The display device 102 comprises a first set of parts 510, 514, 518, 522 for displaying the left images of the stereo images and a second set of parts 512, 516, 520, 524 for displaying the right image of the stereo images.

The working of the 3D video conferencing station 500 is similar with the working of the 3D video conferencing station 200 as described in connection with FIGS. 2A and 2B. A difference is that there is no time control of polarization means 530-544 in front of the display device required in the 3D video conferencing station 500 as depicted in FIG. 5.

Although not depicted in FIG. 5, the 3D video conferencing station 500 comprises a second camera 106 and might comprise a light source 120 which is arranged to create light with the first polarization direction at the first moment and to create light with the second polarization direction at the second moment.

FIG. 6 schematically shows the image processing steps to combine the first 604 and the second image 602 into the third image 606 which has to be transmitted to a remote 3D video conferencing station. In other words the image processing steps to be performed by the combining means 712 are shown. The combining means 712 comprise a processor for computation and memory for storage of intermediate results. The combining means 712 are arranged:

- to compute an intermediate image 608 by computing the difference between the first image 604 and the second image 602;
- to segment the intermediate image 608 to detect a first region 612 corresponding to a first portion of the first image 604;
- to extract the first portion from the first image 604 on basis of the first region 612; and
- to combine the first portion of the first image with a second portion of the second image 602.

In other words the video processing includes replacing the covered face area in image n with information from the uncovered area from an image which is acquired at time n−1, where n indicates the registered image number. The video processing comprises the following steps:

Subtraction of two subsequent images 604-602. Preferably an absolute difference between the subsequent images 604-602 is determined. This yields an intermediate image 608 of which the pixels corresponding to the face of the user have relatively low values, since the two images 604-602 are substantially mutually equal for these parts of the images. The pixels 610-612 corresponding to the glasses have relatively high values;

Detection of the contours of both glasses in the intermediate image 608. The shape and color of the frame of the glasses is known a-priori. This eases the search for the contours.

Extraction of the first portion from the first image 604 on basis of one of the contours.

Replacement of a portion of the second image with the extracted first portion.

Optionally geometric scaling of the first portion from the first image 604 is applied if the contours at moment n and n−1 are not the same. This could be due to a head rotation or head-translation in the direction of the optical axis of the camera, i.e. away or towards the camera.

Optionally photometric scaling of the first portion from the first image 604 is applied to compensate for any residual light-loss in the glasses. Photometric scaling of another portion corresponding to the other part of the glasses might also be applied.

FIG. 7 schematically shows an embodiment of a 3D video conferencing station 700 comprising communication means. The user 110 is wearing glasses 112-114 and is looking at a CRT-based monitor 102 with a frame-rate of 120 Hz. On top of the monitor 102, two cameras 104-106 are placed with a horizontal spacing of e.g. 7 cm with respect to each other. The cameras 104-106 also have a frame-rate of 120 Hz. An electro-optical switch 108 is placed in front of the monitor 102, covering both the front of the monitor 102 as well as the cameras 104-106. This electro-optical switch 108 comprises two layers: a polarization filter 202 and an electrically controlled LC layer 204. At some location above the monitor 102 a light-source 120 is placed for illumination of the user 110. The light-source is partly covered with a casing that enforces the emitted light to pass through another electro-optical switch 206. It also runs at 120 Hz. The monitor 102, the cameras 104-106 and the electro-optical switches 108-206 are all synchronized. The cameras 104-106 are connected to a video processing unit 714. Within a 60 Hz interval, the video processing unit 714 receives from each camera 104-106 two images. The two images of one of the cameras 104-106 are substantially mutually equal except for the transparency of the glasses: on one image the left glass is transparent and the right glass dark and on the other image vice versa. The video processing unit 714 is arranged to combine the two images to a single one, using the steps that are described in connection with FIG. 6. The video processing unit 714 then outputs on each 60 Hz interval a stereo (left and right) image of the user (with transparent glasses) to a video encoder 712. The video encoder 712 compresses, e.g. using MPEG encoding, the video stream in such a way that it fits in the available bandwidth of the communication channel 702. The video encoder 712 is connected to a transmitter 710 that transmits the video signal over the communications channel 702, e.g. internet.

An incoming signal, sent by a remote 3D video conference station, is received by a receiver 704, decoded by a decoder 706 and the resulting stereo (left and right) images are transmitted to the monitor 102 in a time sequential fashion. This is done by a display driver 708 that comprises frame memories to accommodate for a lack of synchronization between the local and the remote 3D video conference stations. The display driver 708 uses two signals to drive the monitor 102: the video signal and the synchronization signal as provided by the synchronizer 220. The latter signal is also used to synchronize the camera's 104-106 and the electro-optical devices 108 and 206. The remote user perceives a 3D-impression of the local user with transparent glasses and vice versa.

Note that for the electro-optical devices 108 and 206 it takes a certain amount of time to go from one polarization state to the other. The cameras should only register images at times where the direction of polarization is stable. Therefore the integration time of the photo-sensors within the camera's 104-106 should be short. This pleads for the use of cameras with CMOS sensors. These are sensitive and therefore can have short integration times.

Instead of a CRT-based display device also other types might be used, e.g. LCD or PDP.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A 3D video conferencing station (200,300,500,700), comprising:
   a camera (104) for acquiring a first image (604) of a first user (110) and a second image (602) of the first user (110);
   receiving means for receiving stereo images of a second user;
   optical means for visualizing the stereo images, the optical means comprising glasses for the first user (110), characterized in that the station is arranged to acquire the first image (604) at a first moment at which the left eye of the first user (110) is more clearly visible by the camera (104) than at a second moment and to acquire the second image (602) at the second moment at which the right eye of the first user (110) is more clearly visible by the camera (104) than at the first moment and that the station comprises computing means (714) for computing a third image (606) on basis of a first portion of the first image (604) corresponding to the left eye of the first user (110) and a second portion of the second image (602) corresponding to the right eye of the first user (110).

2. A 3D video conferencing station (300) as claimed in claim 1, characterized in that the station comprises:
   a display device (102) for displaying the stereo images;
   a first electro-optical shutter (114) being disposed in the left part of the glasses, the first electro-optical shutter (114) having a first open state enabling the first user (110) to view the display device (102) with the left eye and a first closed state disabling the first user (110) to view the display device (102) with the left eye;
   a second electro-optical shutter (112) being disposed in the right part of the glasses, the second electro-optical shutter (112) having a second open state enabling the first user (110) to view the display device (102) with the right eye and a second closed state disabling the first user (110) to view the display device (102) with the right eye; and
   synchronizing means (220) to acquire the first image (604) when the first electro-optical shutter (114) is in the first open state and to acquire the second image (602) when the second electro-optical shutter (112) is in the second open state.

3. A 3D video conferencing station (200) as claimed in claim 1, characterized in that the station comprises:
   a display device (102) for displaying the stereo images;
   a first polarization means (108) being disposed in front of the display device (102) and being arranged to switch between a first polarization state in which the first polarization means (108) is substantially translucent for light with a first polarization direction and substantially opaque for light with a second polarization direction and a second polarization state in which the first polarization means (108) is substantially translucent for light with the second polarization direction and substantially opaque for light with the first polarization direction;

a second polarization means (114) being disposed in the left part of the glasses and being substantially translucent for light with the first polarization direction and substantially opaque for light with the second polarization direction;

a third polarization means (112) being disposed in the right part of the glasses and being substantially translucent for light with the second polarization direction and substantially opaque for light with the first polarization direction;

a fourth polarization means (206) being disposed in front of the camera (104) and being arranged to switch between a third polarization state in which the fourth polarization means (206) is substantially translucent for light with the first polarization direction and substantially opaque for light with the second polarization direction and a fourth polarization state in which the fourth polarization means (206) is substantially translucent for light with the second polarization direction and substantially opaque for light with the first polarization direction; and synchronizing means (220) to acquire the first image (604) when the fourth polarization means (206) is in the third polarization state and to acquire the second image (602) when the fourth polarization means (206) is in the fourth polarization state.

4. A 3D video conferencing station (200) as claimed in claim 3, characterized in that the first polarization means (108) and the fourth polarization means (206) are combined.

5. A 3D video conferencing station (500) as claimed in claim 1, characterized in that the station comprises:

a display device (102) for displaying the stereo images;

a first polarization means (530) being disposed in front of a first part (510) of the display device (102) and being substantially translucent for light with a first polarization direction and substantially opaque for light with a second polarization direction;

a second polarization means (532) being disposed in front of a second part (512) of the display device (102) and being substantially translucent for light with the second polarization direction and substantially opaque for light with the first polarization direction;

a third polarization means (114) being disposed in the left part of the glasses and being substantially translucent for light with the first polarization direction and substantially opaque for light with the second polarization direction;

a fourth polarization means (112) being disposed in the right part of the glasses and being substantially translucent for light with the second polarization direction and substantially opaque for light with the first polarization direction;

a fifth polarization means (502) being disposed in front of the camera (104) and being arranged to switch between a first polarization state in which the fifth polarization means (502) is substantially translucent for light with the first polarization direction and substantially opaque for light with the second polarization direction and a second polarization state in which the fifth polarization means (502) is substantially translucent for light with the second polarization direction and substantially opaque for light with the first polarization direction; and synchronizing means (220) to acquire the first image (604) when the fifth polarization means (502) is in the first polarization state and to acquire the second image (602) when the fifth polarization means (502) is in the second polarization state.

6. A 3D video conferencing station (200,300,500,700) as claimed in claim 3, characterized in that the station comprises a light source (120) being arranged to create light with the first polarization direction at the first moment and to create light with the second polarization direction at the second moment.

7. A 3D video conferencing station as claimed in claim 1, characterized in that the combining means (714) are arranged to compute the third image (606) on basis of a difference between the first image (604) and the second image (602).

8. A 3D video conferencing station as claimed in claim 7, characterized in that the combining means (714) are arranged:

to compute an intermediate image by computing the difference between the first image (604) and the second image (602);

to segment the intermediate image to detect a first region (612) corresponding to the first portion;

to extract the first portion from the first image (604) on basis of the first region (612); and to combine the first portion with the second portion of the second image (602).

* * * * *